(12) United States Patent
Bouvier et al.

(10) Patent No.: US 11,211,211 B2
(45) Date of Patent: Dec. 28, 2021

(54) CONTROL DEVICE FOR AN ELECTRONIC UNIT, METHODS FOR ADJUSTMENT OF THE CONTROL DEVICE AND MOTOR VEHICLE REAR VIEW MIRROR WITH AN INTEGRAL DEVICE OF THAT KIND

(71) Applicant: C&K COMPONENTS S.A.S., Dole (FR)

(72) Inventors: Laurent Bouvier, Monnieres (FR); Laurent Kubat, Dole (FR); Fabrice Valcher, Dole (FR)

(73) Assignee: C&K COMPONENTS S.A.S., Dole (FR)

( * ) Notice: Subject to any disclaimer, the term of this patent is extended or adjusted under 35 U.S.C. 154(b) by 2 days.

(21) Appl. No.: 16/701,702

(22) Filed: Dec. 3, 2019

(65) Prior Publication Data
US 2020/0185165 A1    Jun. 11, 2020

(30) Foreign Application Priority Data
Dec. 6, 2018 (FR) ....................... 1872449

(51) Int. Cl.
*H01H 3/12* (2006.01)
*H01H 13/14* (2006.01)
(Continued)

(52) U.S. Cl.
CPC ............ *H01H 13/14* (2013.01); *H01H 3/125* (2013.01); *H01H 13/04* (2013.01); *B60R 1/02* (2013.01);
(Continued)

(58) Field of Classification Search
None
See application file for complete search history.

(56) References Cited

U.S. PATENT DOCUMENTS 8,253,698 B2 *   8/2012   Chen ..................... G06F 3/0338
                                                345/173
8,420,965 B2 *   4/2013   Rappoport ............... H01H 1/34
                                                200/249
(Continued)

FOREIGN PATENT DOCUMENTS

EP    0419145 A1    3/1991
WO    2008152457 A1   12/2008

OTHER PUBLICATIONS

Keybutton Stabilizer, IBM Technical Disclosure Bulletin, vol. 31, No. 7, Dec. 1988.

*Primary Examiner* — Felix O Figueroa
(74) *Attorney, Agent, or Firm* — Fox Rothschild LLP

(57) ABSTRACT

A control device includes an upper actuator panel, a lower support frame relative to which the upper panel is mounted to be mobile vertically, an electric switch the body of which is carried by the upper panel, and a set of two arms for actuating the electric switch. Each arm of the set includes a distal section that bears against a portion of the upper panel, a proximal section that bears on the actuator of the electric switch, and an intermediate section that bears against a portion of the lower frame and about which each actuator arm is mounted to pivot. The actuator arms cooperate with the upper panel and the lower frame to maintain the upper panel horizontal during its movement relative to the lower support frame.

20 Claims, 14 Drawing Sheets

(51) Int. Cl.
  *H01H 13/04* (2006.01)
  *B60R 1/02* (2006.01)
  *H01H 13/52* (2006.01)

(52) U.S. Cl.
  CPC ......... *H01H 13/52* (2013.01); *H01H 2215/02* (2013.01); *H01H 2221/032* (2013.01); *H01H 2227/032* (2013.01)

(56) References Cited

U.S. PATENT DOCUMENTS

| | | | |
|---|---|---|---|
| 8,829,378 B2* | 9/2014 | Villain | G06F 3/03547 200/512 |
| 10,832,876 B2* | 11/2020 | Thrien | H01H 3/125 |
| 2015/0206671 A1* | 7/2015 | Yang | H01H 13/14 200/341 |
| 2016/0064165 A1 | 3/2016 | Chao | |
| 2019/0157023 A1 | 5/2019 | Thrien et al. | |

* cited by examiner

CONTROL DEVICE FOR AN ELECTRONIC UNIT, METHODS FOR ADJUSTMENT OF THE CONTROL DEVICE AND MOTOR VEHICLE REAR VIEW MIRROR WITH AN INTEGRAL DEVICE OF THAT KIND

RELATED APPLICATIONS AND CLAIM OF PRIORITY

This patent document claims priority under 35 U.S.C. § 119(a) to France Patent Application No. 1872449, filed Dec. 6, 2018.

BACKGROUND

This patent document proposes a device for controlling an electronic unit including a mobile upper panel on which at least one control action is exerted.

International patent application publication number WO2008/152457, filed by Bestele, describes and represents a control device in which the actuator arms are articulated relative to the upper panel and relative to the frame.

The switch is actuated via a single actuator arm by the control action, which causes an imbalance of the system such that the control action is exerted on the upper panel at a point positioned near the position of the switch or at a point far from the latter.

Moreover, each arm is connected to the upper panel, to the lower frame or to the other arm by means of articulations which necessitate some functional clearance to enable the relative movement of the components.

Those functional clearances imply that the components of the device move relative to one another, a consequence of which is that the upper panel is not correctly maintained in a horizontal orientation. Another consequence of these relative movements is that the force resulting from the control action is not transmitted homogeneously to the switch.

European patent EP 0.419.145A1 to Gretton describes a control device in which each actuator arm bears against the upper panel, against the frame or against the upper arm.

That embodiment enables the problems resulting from the functional clearances cited hereinabove to be avoided.

However, according to this embodiment each upper arm is connected to the upper panel at a point positioned horizontally in an intermediate position between the centre of the upper panel and the peripheral edge of the upper panel.

Thus if the point of application of the control action on the upper panel is positioned near the peripheral edge of the upper panel the upper panel tilts about an actuator arm.

This document describes a device that solves at least some of the problems discussed above.

SUMMARY

In various embodiments, a device for controlling an electronic unit, includes: (a) a globally planar and horizontal upper panel on an upper face of which a control member is adapted to exert a control action that includes a pressure force oriented vertically downward; (b) a lower support frame relative to which the upper panel is mounted to be moved by the control action in a globally vertically downward movement between a high rest position and a low active position; (c) an electric switch including a switch body and an actuator mounted to be mobile relative to the switch body, the switch body of which is carried by the upper panel and can be actuated by the control action to produce a control signal of the electronic unit when the upper panel is in its low active position; and (d) a set of at least two arms for actuating the electric switch. In the set, each arm includes: (i) a distal upper end section that bears vertically upward against a lower portion of the upper panel; (ii) a proximal lower end section for actuating the electric switch that bears on the actuator of the electric switch; and (iii) an intermediate section that bears vertically downward against a facing portion of the lower frame and about which each actuator arm is able to pivot about a horizontal geometric pivot axis. The actuator arms cooperate with the upper panel and the lower frame to maintain the upper panel parallel to a horizontal plane during its vertical movement relative to the frame.

According to some embodiments, the set of actuator arms may include two actuator arms and a first portion of the proximal section of each actuator arm bears permanently and vertically upward against a facing second portion of the proximal section of the other of the two actuator arms.

According to some embodiments, the bearing engagement between a first portion of the proximal section of each actuator arm and a facing second portion of the proximal section of the other of the two actuator arms may include a pivoting bearing engagement about a horizontal geometric axis.

According to some embodiments, the first portion of the proximal section of each actuator arm may bear vertically upward against a facing portion of the actuator of the electric switch.

According to some embodiments, the two actuator arms may be two opposite arms aligned longitudinally in a globally longitudinal direction orthogonal to the horizontal plane.

According to some embodiments, the electric switch may be disposed vertically between a support that is fixed relative to the upper panel and the proximal section of each actuator arm.

According to some embodiments, the distal section of each actuator arm may be positioned longitudinally in line with the middle of the upper panel.

According to some embodiments, the electric switch may be disposed vertically between a support that is fixed relative to the upper panel and the proximal section of each actuator arm.

According to some embodiments, the device may be of symmetrical design with respect to a vertical and transverse median plane and with respect to a longitudinal and vertical median plane.

According to some embodiments, all of the actuator arms may be identical.

According to some embodiments, the first portion and the second portion of the proximal section of each actuator arm may transversely adjacent, and the first portion includes a plane upper bearing facet for the actuator of the electric switch.

In other embodiments, a method for initial adjustment of the high position of the upper panel of a device such at that described above may include: (i) applying a force in the vertical upward direction to the proximal sections of the actuator arms until a particular height of the upper panel relative to the lower support frame is reached; and (ii) producing a rest pin fixed relative to the lower support frame defining a surface on which the proximal sections of the actuator arms rest to determine the high position of the upper panel.

According to some embodiments of the method, the step of producing the rest pin may include positioning a rest pin relative to the lower support frame so that an upper end of that rest pin cooperates with the proximal sections of the actuator arms, and immobilizing the rest pin relative to the lower support frame.

According to some embodiments of the method, the rest pin may comprise the free end section of a screw mounted on the lower support frame by screwing it thereinto.

According to some embodiments of the method, positioning the rest pin may include mounting the rest pin to slide axially in the vertical direction in a hole in the lower support frame and the upper end of which is in contact with the proximal lower end sections of the actuator arms, and the step of immobilizing the rest pin may include placing the glue or resin in the hole to contact with the lower end of the rest pin and drying or hardening the block of glue or resin.

According to some embodiments of the method, the force is applied by means of the rest pin.

In other embodiments, a method for initial adjustment of calibration of a device such as that described above may include: (a) applying to the body of the electric switch a force in the downward vertical direction to preload the electric switch; and (b) producing an adjustment abutment fixed relative to the upper panel defining an abutment surface that cooperates with a facing portion of the body of the electric switch to fix the position of the body of the electric switch relative to the upper panel.

According to some embodiments of that method, the step of producing the adjustment abutment may include: (1) positioning an abutment member relative to the upper panel so that a lower end of that abutment member is in contact with the facing portion of the body of the electric switch; and (2) immobilizing the abutment member relative to the upper panel. The abutment member comprise glue or resin that is placed through a hole in the upper panel, wherein a lower face of a block form formed by the glue or resin is in contact with the facing portion of the electric switch, and immobilizing the abutment member may include drying said block of glue or of resin or hardening said block of glue or of resin.

According to some embodiments of that method, the abutment member may include an abutment pin that is mounted to slide axially in the vertical direction in a complementary hole in the upper panel so that the lower end of the abutment pin is contact with the facing portion of the electric switch. Immobilizing the abutment member may include placing into the hole glue or to contact the upper end of the pin, and drying or hardening the glue or resin.

According to some embodiments of that method, the preloading force may be applied by means of a removable preloading finger that is guided to slide vertically relative to the upper panel.

Finally, in some embodiments, a motor vehicle rear view mirror may include: (i) a main panel of vertical and longitudinal orientation, a front transverse face of which is reflective; (ii) a lower module for controlling functions of an electronic unit that is arranged transversely behind the main panel; and a device such as that described above for controlling the electronic unit that is arranged above the module and behind the main panel.

BRIEF DESCRIPTION OF THE FIGURES

Other features and advantages of the invention will become apparent on reading the following detailed description, to understand which reference should be made to the appended drawings, in which.

DETAILED DESCRIPTION

Figure 1:
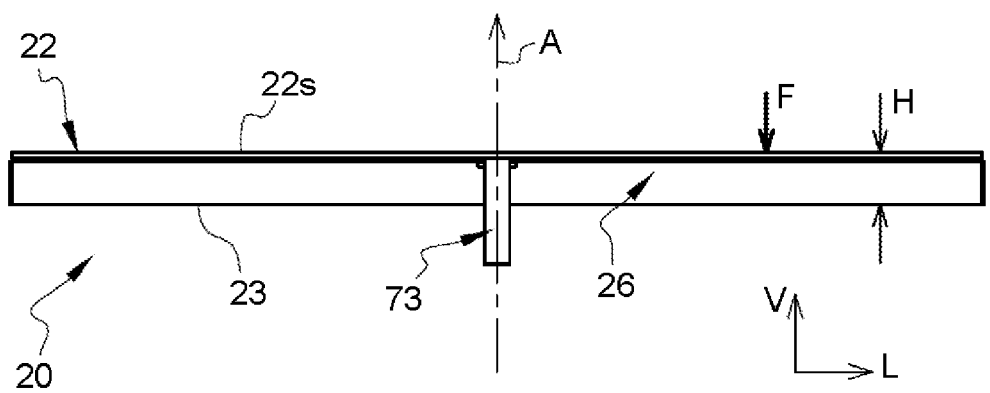
FIG. 1 is a side view of a device according to one embodiment of the invention.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

When used in this document, terms such as "top" and "bottom," "upper" and "lower", "vertical" and "horizontal" or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components. Thus, for the description of the invention and the understanding of the claims there will be adopted non-limitingly and with no limiting reference to terrestrial gravity vertical, longitudinal and transverse orientations in accordance with the system of axes V, L, T indicated in the figures, the longitudinal axis L and the transverse axis T of which extend in a horizontal plane.

In the following description elements that are identical, similar or analogous will be designated by the same reference numbers.

This document discusses a device for controlling an electronic unit including a globally plane and horizontal upper panel on an upper face of which a control member is adapted to exert a control action that includes a pressure force oriented globally downward, a lower support frame relative to which the upper panel is movable in a globally vertically downward movement by the control action, a switch (or electric switch) that is carried by the frame and can be actuated by the control action to produce a control signal of the electronic unit and at least two arms for actuating the switch.

The control device is such that the upper panel is moved downward by the control action in a movement that includes an overall vertical movement in translation and so as to actuate the switch by means of the actuator arms.

The actuator arms cooperate with the upper panel and with the lower frame to maintain the upper panel substantially parallel to its horizontal plane when the control action is exerted.

This document therefore proposes a device for controlling an electronic unit enabling the upper panel to be maintained parallel to its horizontal plane whatever the position of the point of application of the control action, while proposing a design that is simple to assemble and to connect electrically while enabling initial adjustment of the total height of the device and/or of the calibration of the electric switch.

There has been represented in the figures a device 20 for controlling an electronic unit or functions implemented by an electronic unit.

For example the device 20 may be integrated into a motor vehicle rear view mirror.

Figure 11:
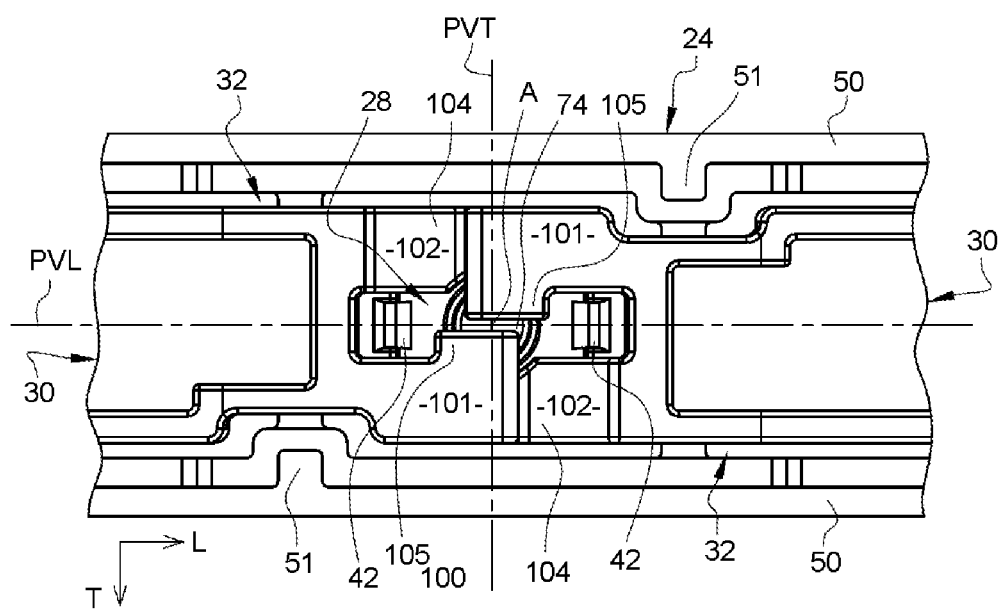
FIG. 11 is a view from below of the central part of the device from FIG. 1 shown without its lower casing.

In that embodiment the control device 20 features a two-fold symmetry of design with respect the transverse vertical plane PVT and the longitudinal vertical plane PVL indicated in FIG. 11.

The control device 20 includes an upper panel 22 that is part of an upper cover 24 of the control device 20 and on which a user acts to control the electronic unit 20.

The upper panel 22 includes a planar element that here is horizontal and of rectangular shape, the longer sides of which are parallel to the longitudinal direction "L" and the shorter sides of which are parallel to the transverse direction "T".

Actuation of the control device 20 may occur by exerting an action, referred to hereinafter as a "control action" or "control force", on the upper face 22s of the upper panel 22 via a pointing element that is for example a finger of the user.

The control action includes applying a pressure force "F" oriented mainly vertically downward, which is exerted by the pointing element at a point of contact between an end of the pointing element and the upper face 22s of the upper panel 22.

In accordance with this embodiment the upper panel 22 includes an upper plate of the upper cover 24 that is produced for example by moulding a rigid plastic material.

Under its upper panel 22 the upper cover 24 includes two longitudinal vertical lateral walls 50 and two transverse vertical lateral walls 52 that delimit an internal housing 55.

These lateral walls 50, 52 include respective vertical external guide grooves 51, 53.

In the vicinity of each of its opposite longitudinal ends each longitudinal lateral wall 50 includes a horizontally oriented oblong opening 54.

Each oblong opening 54 is delimited by two opposite horizontal faces 56.

The control device 20 includes a lower support frame 26 by means of which the control device 20 may be assembled to and/or associated with an electronic unit (not shown).

The lower support frame 26 is represented in FIGS. 1 to 5 in the form of a lower casing 26 of rectangular parallelepiped general shape the upper face 25 of which is open vertically upward.

In accordance with this embodiment the lower casing 26, which is produced for example by moulding a rigid plastic material, includes a horizontal lower plate 23.

Above its lower plate 23 the lower support frame 26 includes two longitudinal vertical lateral walls 60 and two transverse vertical lateral walls 62 that delimit the internal housing 66 of the lower casing 26.

These lateral walls 60, 62 include respective internal vertical guide ribs 61, 63.

The dimensions of the upper cover 24 with its lateral walls 50 and 52 and those of the lower casing 26 with its lateral walls 60 and 62 are such that the upper cover 24 is slidingly received inside the lower casing 26 with the external guide ribs 61, 63 received in and sliding vertically in the external guide grooves 51, 53.

The upper panel 22 is therefore mounted to be mobile relative to the lower support frame in the form of the casing 26 and is moved relative to the latter in a vertical downward movement—between its high rest position shown in the figures and a low active position—when a control action is exerted on the upper face 22s of the upper panel 22.

When the control action is released the upper panel 22 moves in the opposite direction, that is to say it effects a vertical upward movement relative to the lower support frame 26.

This return of the upper panel vertically toward its high rest position is an elastic return described hereinafter.

According to a feature that is not represented in the figures, to form a whole after assembly "clips" may be provided between the upper cover 24 and the lower casing 26 defining a maximum high position of the upper cover 24 relative to the lower casing 26.

The control device 20 includes a switch or electric switch 28 that can be actuated when the upper panel 22 is moved downward by the control action, then producing a control signal to be sent to the electronic unit.

The electric switch 28 may be of any known type.

A pressure force exerted on the upper panel 22 is transmitted to the electric switch 28 so that the electric switch 28 is actuated by the control action.

In accordance with one embodiment the switch 28 is adapted to produce the control signal when it is subjected to a pressure force greater than a predetermined value.

The electric switch 28 is adapted to change state if the value of the control action becomes greater than said threshold value.

The electric switch 28 therefore enables detection of any control action that includes exerting on the upper face 22s of the upper panel 22 a pressure force F the value of which is greater than a value termed a predetermined threshold value.

The control signal is produced when the electric switch 28 changes state.

A tactile feedback sensation may also be perceived by the user via the pointing element, for example via one of their fingers, when the electric switch 28 changes state, because the user senses in particular a rapid modification of the resistance to movement of the upper panel 22, in the manner of a pushbutton "click".

The user is therefore informed by tactile means that the control action has been exerted on the control device 20.

The electric switch 28 is for example of the type described and represented in U.S. Pat. No. 6,930,266, the disclosure of which is fully incorporated into this document by reference. U.S. Pat. No. 6,930,266 includes an internal trigger member that changes state abruptly, also termed a trigger dome forming a mobile electric contact.

The electric switch 28 includes a switch casing or body 70 of parallelepiped general shape and an actuator 72 in the form of a pusher member that extends axially outside the switch body 70 along the axis "A" of actuation of the electric switch 28.

The actuator 72 of the electric switch 28 is delimited axially by a globally plane and horizontal end face 74.

In accordance with the invention the electric switch 28 is carried by the upper panel 22 with its actuator 72 oriented vertically downward along the actuation axis A.

The electric switch 28 further includes terminals 75 for its electrical connections and a metal assembly and closure cage 76.

Figure 2:
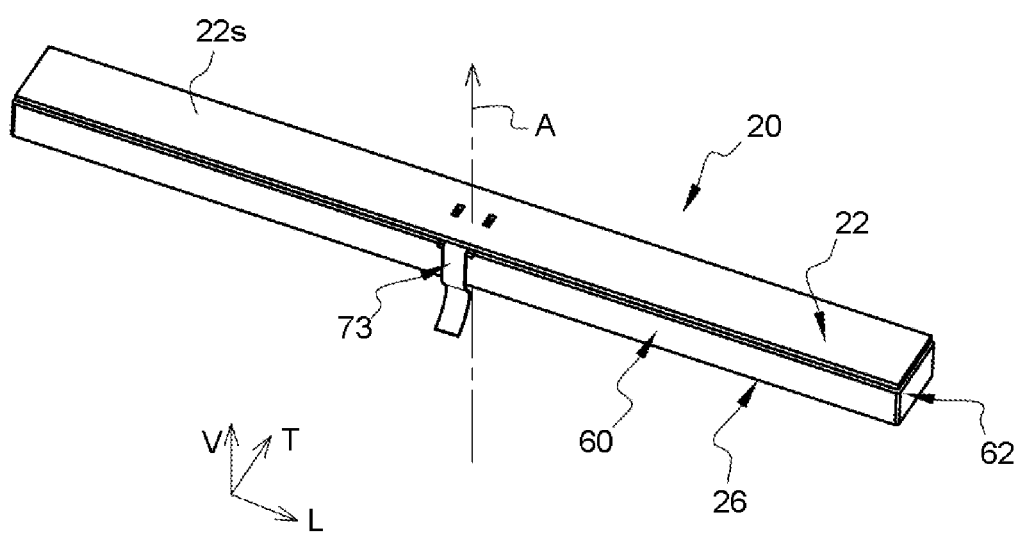
FIG. 2 is a perspective view of the device from FIG. 1.
Figure 3:
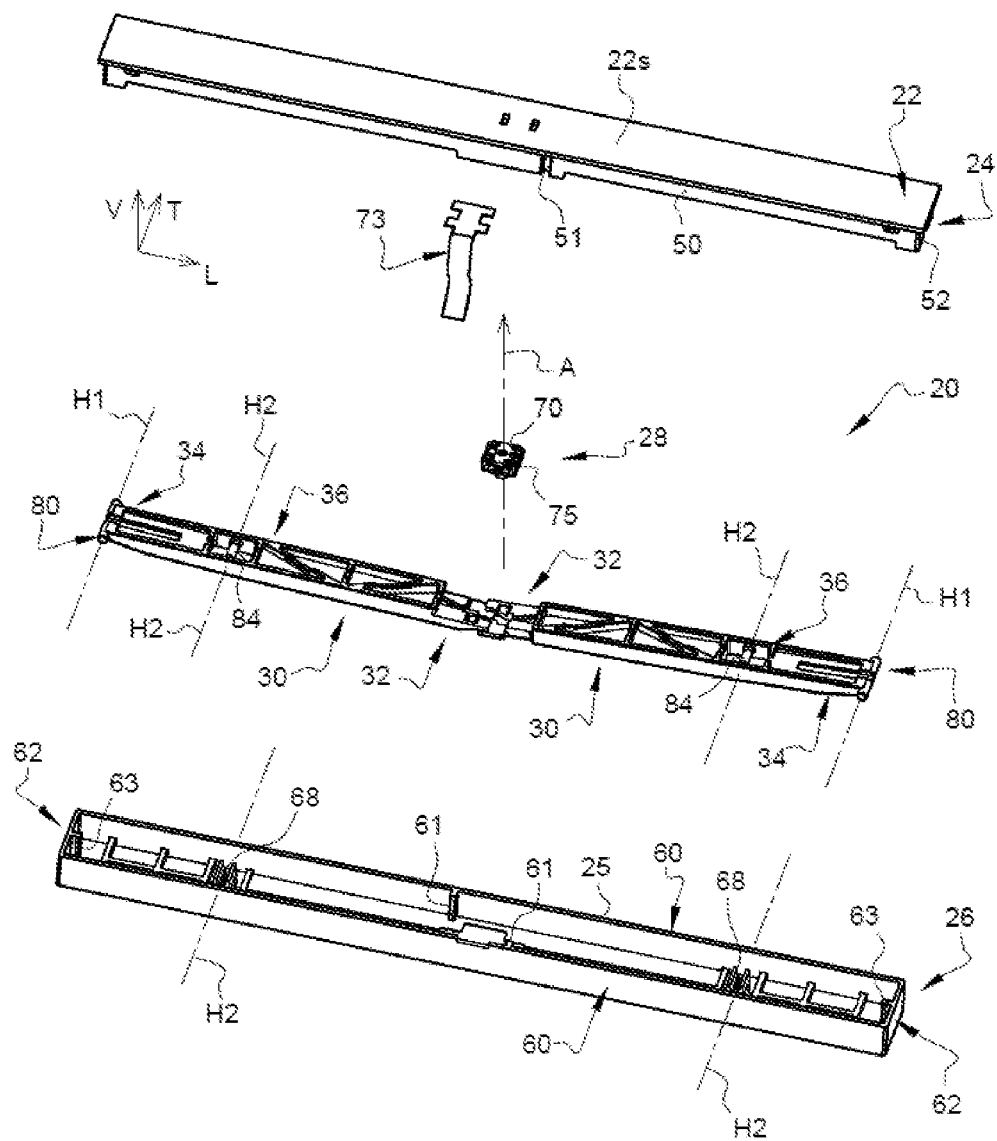
FIG. 3 is an exploded perspective view of the main components of the device from FIG. 2.
Figure 4:
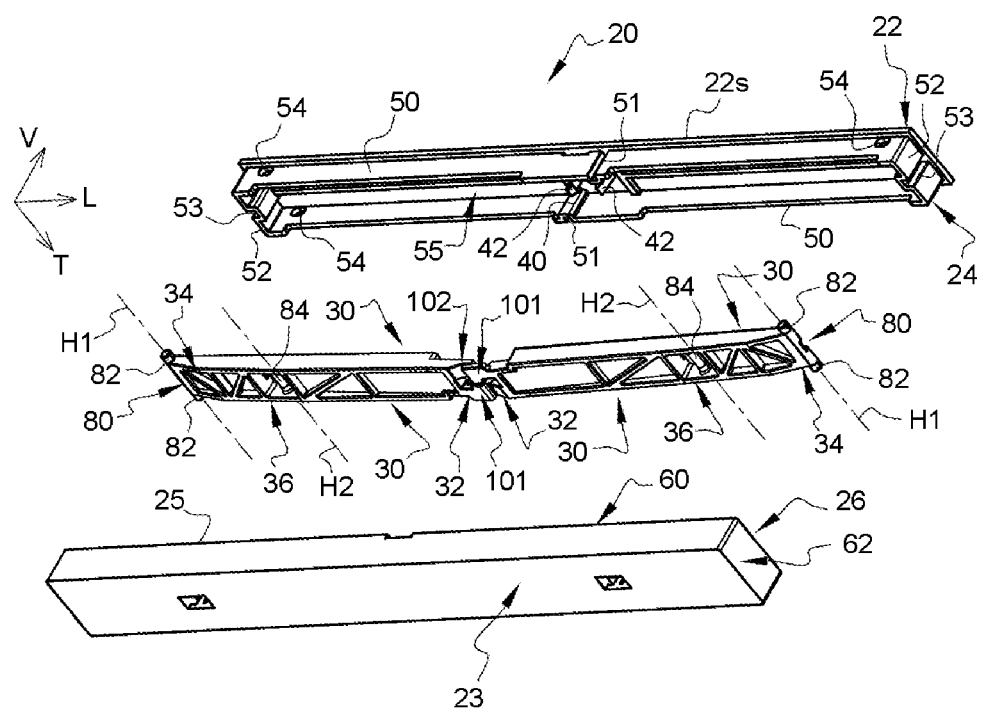
FIG. 4 is a perspective view from another angle of some of the components of the device shown in FIG. 3.
Figure 5:
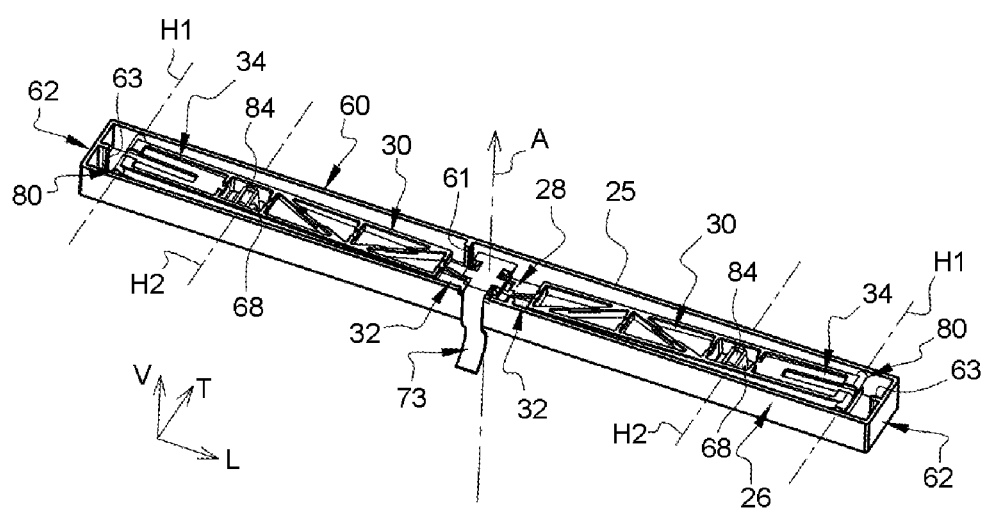
FIG. 5 is a view analogous to that of FIG. 2 in which the device is shown without its upper cover.
Figure 6:
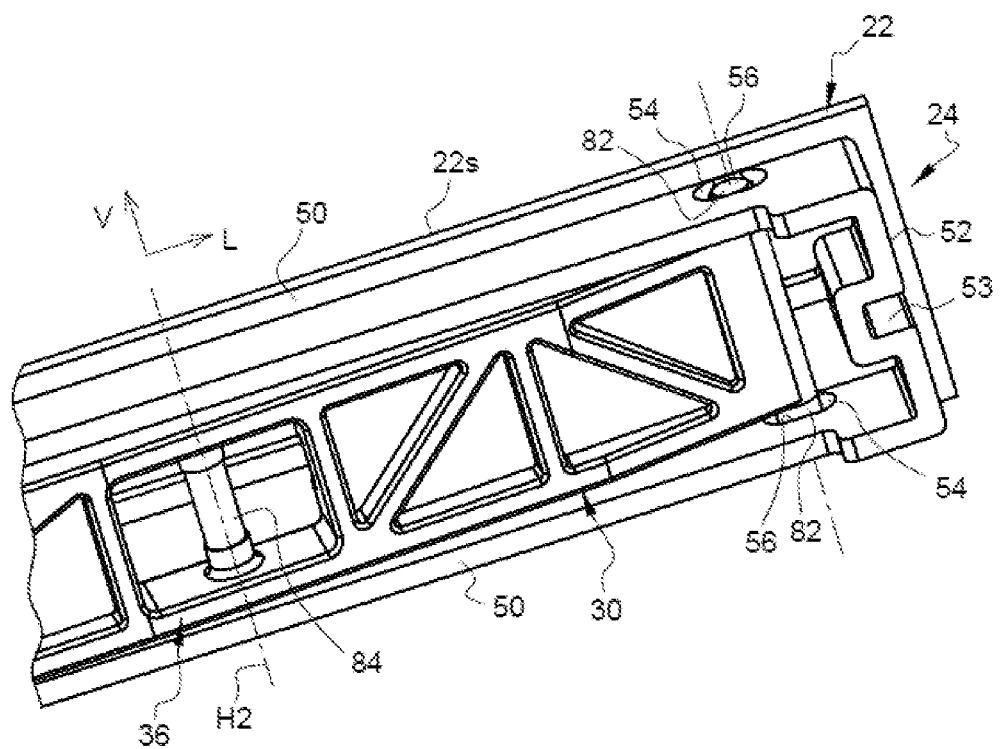
FIG. 6 is a detail view to a larger scale that shows the mounting of the upper distal end of an actuator arm in the upper cover.
Figure 7:
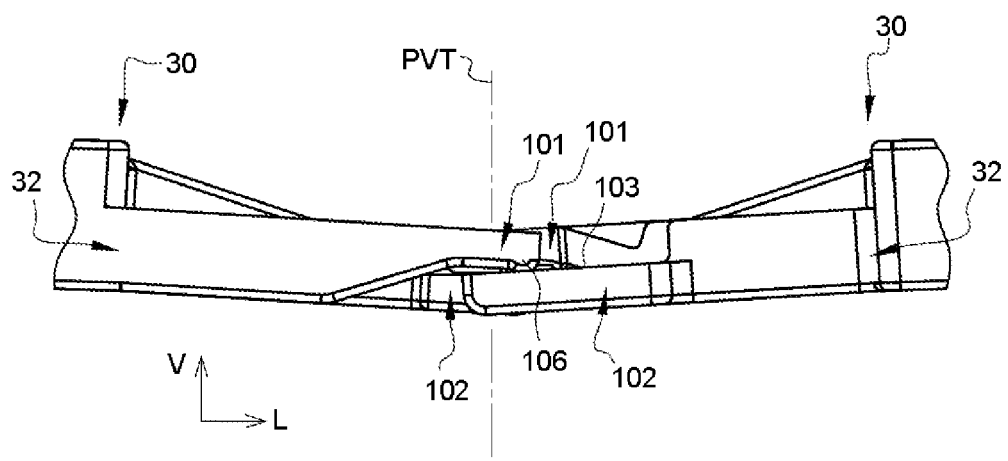
FIG. 7 is a side view that shows the arrangement and the cooperation of the lower proximal ends of the two opposite actuator arms of the device from FIGS. 1 to 5.
Figure 8:
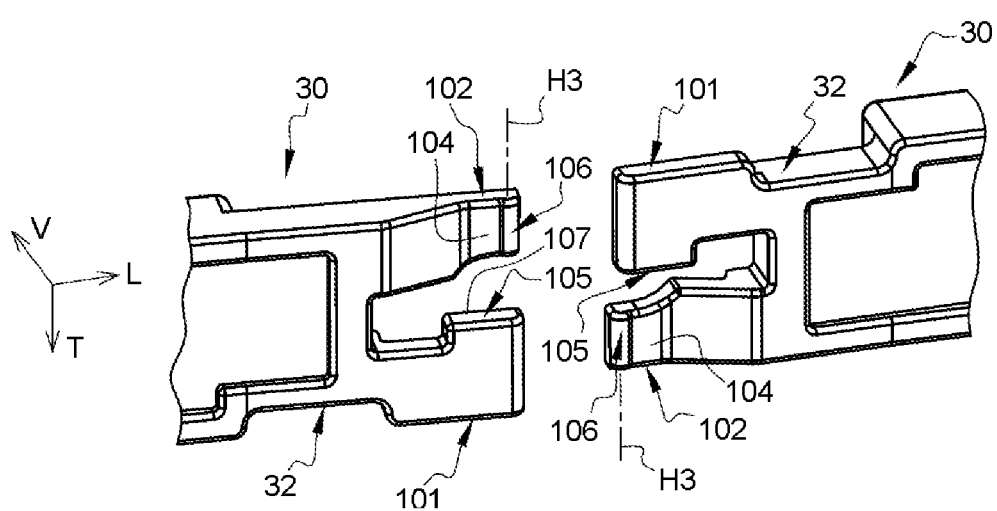
FIG. 8 is a detail perspective view from below and to a larger scale that shows the design of the lower proximal ends of the two opposite actuator arms of the device from FIGS. 1 to 5.
Figure 9:
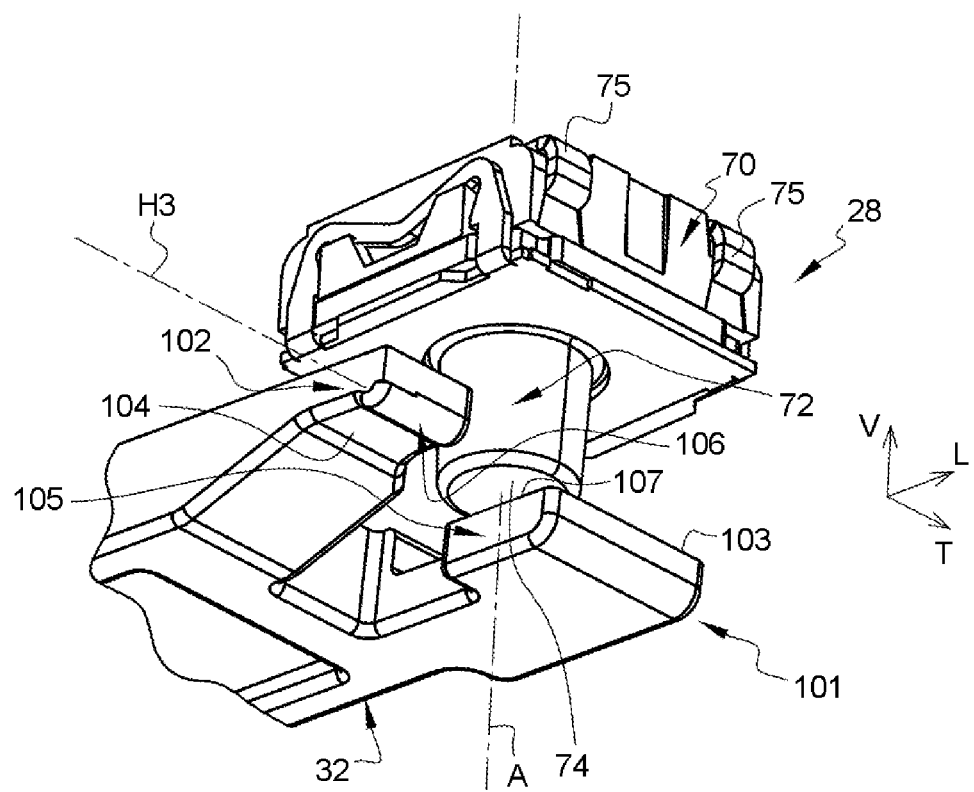
FIG. 9 is a perspective view to a larger scale that shows the electric switch of the device from FIGS. 1 to 5 and the cooperation of its actuator with an associated first portion of the proximal section of an actuator arm.
Figure 10:
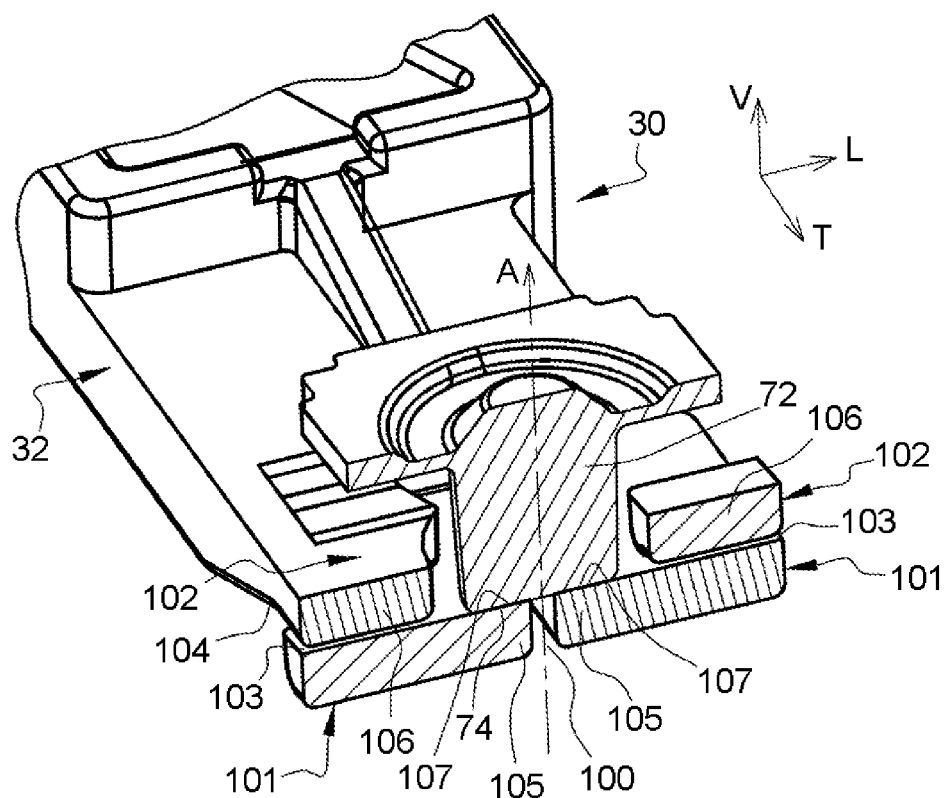
FIG. 10 is a perspective view of the actuator of the electric switch in section on a vertical and transverse median plane and the proximal ends of the two opposite actuator arms.

By way of nonlimiting example the electrical connections of the contact terminals 75 of the electric switch 28 may be produced by means of a flat cable or "Flex" 73 a connection part of which projects out of the device 20 (see FIGS. 1, 2 and 5).

The electric switch 28 is disposed vertically between the upper panel 22 and the actuator arms 30, to be more precise the proximal sections of the actuator arms.

Here the control device 20 includes two arms 30 for actuating the electric switch 28 that are positioned overall between the upper panel 22 and the lower support frame 26 inside the lower casing.

Here the two actuator arms 30 are of identical design, extending overall in the longitudinal direction and arranged opposite one another.

A proximal section 32 of the lower end of each actuator arm cooperates with the actuator 72 of the electric switch 28 to actuate the electric switch 28 when a control action is exerted on the upper face 22s of the upper panel 22.

The electric switch 28 is longitudinally positioned substantially at the level of the centre of the upper panel 22. The two actuator arms 30 are arranged longitudinally on respective opposite sides of the switch 28.

The electric switch 28 is carried by a support 40 that is carried by the upper panel 22 and the electric switch 28 is mounted so that it is compressed axially between the upper panel 22 and the lower end proximal sections 32 of the actuator arms 30.

In known manner, the design of the electric switch is such that it is permanently urged elastically toward a stable state by the action of an internal elastic member that is for example its trigger member, which is for example monostable and produced in the form of a trigger "dome".

The electric switch is therefore also able to produce the elastic return of the upper panel 22 to its high position relative to the lower support frame 26.

Instead of this or in combination with this the elastic return may be produced by springs provided for this purpose and disposed between the upper panel 22 and the lower support frame 26.

Here the support 40 is designed in the form of an elastically deformable clip 42 in which the body 70 of the electric switch 28 is nested.

An upper end distal section 34 of each actuator arm 30 cooperates with the upper panel 22 to maintain the upper panel 22 parallel to a horizontal plane during the vertical movement of the upper panel 22 relative to the lower support frame 26.

To this end the upper end distal section 34 of each actuator arm 30 bears vertically upward against a portion of the upper panel 22.

In the embodiments described in this document the lower end proximal sections 32 are "proximal" sections in that they are arranged longitudinally at the centre of the device 20 near one another and near the electric switch 28.

The opposite sections 34 are "distal" sections in that each section 34 is at a distance from the centre.

The distal section 34 of each actuator arm 30 is positioned longitudinally as close as possible to a transverse peripheral edge of the upper panel 22 so that all of the end distal sections 34 of the actuator arms 30 are separated by the greatest possible lengthwise distance.

At its free end each distal section 34 is shaped as a transverse rod 80 two opposite sections 82 of which project transversely. In the assembled position of the components each section 82 of a rod 80 is received and slides between the two opposite horizontal faces 56 of an associated oblong opening 54 in the upper casing.

Each distal section 34 is therefore mounted relative to the upper panel so as to be articulated about a horizontal axis corresponding to the axis "H1" of the rod 80 and to slide inside two transversely opposite oblong openings 54.

Each proximal section 32 of each actuator arm 30 is connected to the distal section 34 by an intermediate section or central section 36 that is the section by means of which the actuator arm 30 is mounted to pivot relative to the lower support frame 26 about a horizontal pivot axis "H2".

To this end the intermediate section 36 of each actuator arm 30 bears vertically downward against an associated portion of the lower support frame 26 so that the actuator arm 30 is able to pivot both ways about a pivot axis "H2" located substantially at the mid-length of the actuator arm 30.

The intermediate section 36 includes a transverse articulation shaft 84 that is received in a complementary concave semicylindrical housing 68 formed inside the lower casing 26 above the upper face of the lower plate 23.

Each housing 68 is open vertically upward.

In the assembled position of the components each transverse shaft 84 bears vertically downward in its associated housing 68 in which it is mounted to pivot both ways.

In accordance with one embodiment each transverse shaft 84 of an actuator arm 30 is elastically nested in the complementary housing 68 so as to retain the shaft 84 and the actuator arm 30 vertically relative to the lower support frame.

Each lower end proximal section 32 of an actuator arm 30 is here divided, in the overall form of a fork, by a longitudinal and vertical slot 100 into a first lateral end lug 101 and a second lateral end lug 102.

Each lateral end lug 101, 102 is in the general form of a plate.

The two lateral end lugs 101, 102 are offset vertically relative to one another, here with the first lateral lug 101 offset vertically downward relative to the second lateral lug 102.

The first lateral lug 101 is delimited by a plane horizontal upper facet 103.

The upper facet 103 is a bearing surface for the second lateral lug 102 of the other actuator arm 30.

The first lateral lug 101 includes a central heel 105 the upper face of which is delimited by a plane horizontal upper facet 107 that here is coplanar with the upper facet 103.

The second lateral lug 102 is delimited by a lower face 104 that includes a projecting portion 106 shaped as a convex half-cylinder with transverse axis "H3".

On the assembled position of the components the two proximal sections 32 of the two actuator arms 30 are interleaved in one another so that:

i) each upper facet 103 of a first lateral lug 101 bears vertically upward against an axial generatrix of the projecting semicylindrical portion 106 of the second lateral lug of the other of the two actuator arms 30 so as to constitute a support pivoting about a horizontal geometric axis "H3" and sliding longitudinally;

ii) the two heels 105 of each of the two first lateral lugs 101 are transversely adjacent and their upper facets 107 are globally coplanar to constitute a surface that bears permanently and simultaneously against the end transverse face 74 of the actuator 72 of the electric switch 28.

This design enables direct action on the actuator 72 of the electric switch 28 by means of the actuator arms 30-32 without recourse to any other lever or analogous movement and/or force redirection device.

The invention is not limited to a pair of longitudinally opposed actuator arms.

It is for example possible to provide three or four actuator arms arranged radially in a "star" shape around the electric switch 28 with their proximal sections acting on its actuator and their distal sections bearing against the underside of the upper panel.

The device according to the invention has just been described with the panel 22/cover 24 in the high or upper part and with the support frame 26/casing 26 in the low or lower part. However, it is of course possible to "overturn" the device and to have the electric switch 28 in the low or lower part, the proximal sections 32 in the high or upper part, and the distal sections 34 in the low or lower position, the equilibrium and the operation of the control device remaining exactly the same.

A user can actuate the control device 20 for example by vertically "pinching" the device between two fingers (thumb and index finger) of the same hand.

A so-called "touch-sensitive" panel or pad enabling the user for example to select one or more functions may be associated with a device according to the invention, for example under the lower face of the lower plate 23 of the support frame, the user then being very easily able to validate a previously selected function by using the control device 20 according to the invention to actuate the electric switch 28 that serves as a validation switch.

Thanks to the design according to the invention and the arrangement of the electric switch 28 mounted on the upper panel 22 and the actuator arms of the actuator 72 of the electric switch 28, the control device may comprise a very small number of components.

It therefore enables easy initial adjustment of the total height of the device and of the calibration to determine a preloading value of the device.

Figure 12:
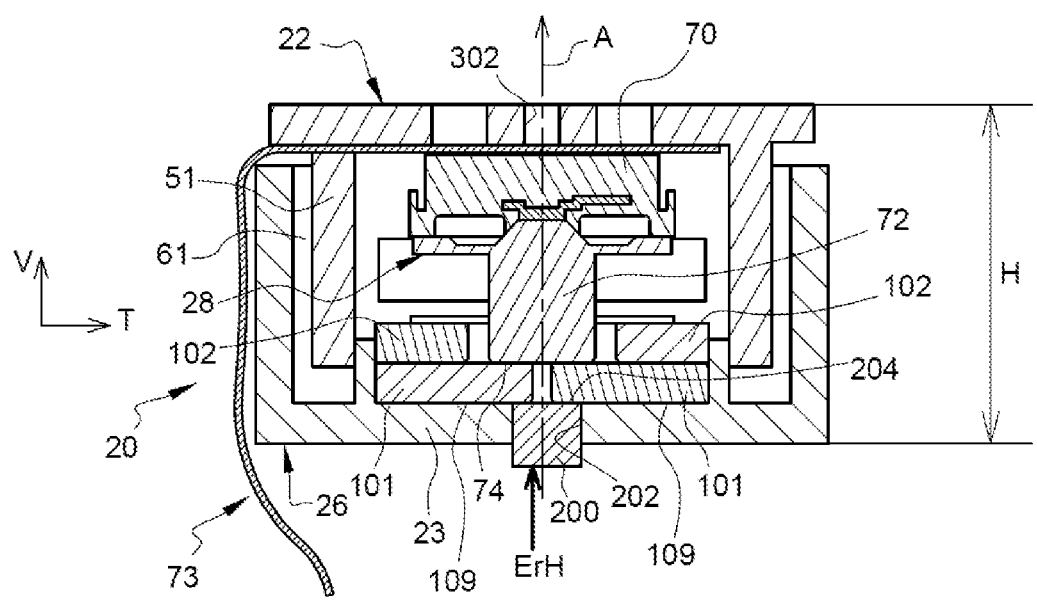
FIG. 12 is a detail sectional view on the vertical transverse median plane PVT that shows diagrammatically a method for initial adjustment of the total height of the control device according to the invention.
Figure 13:
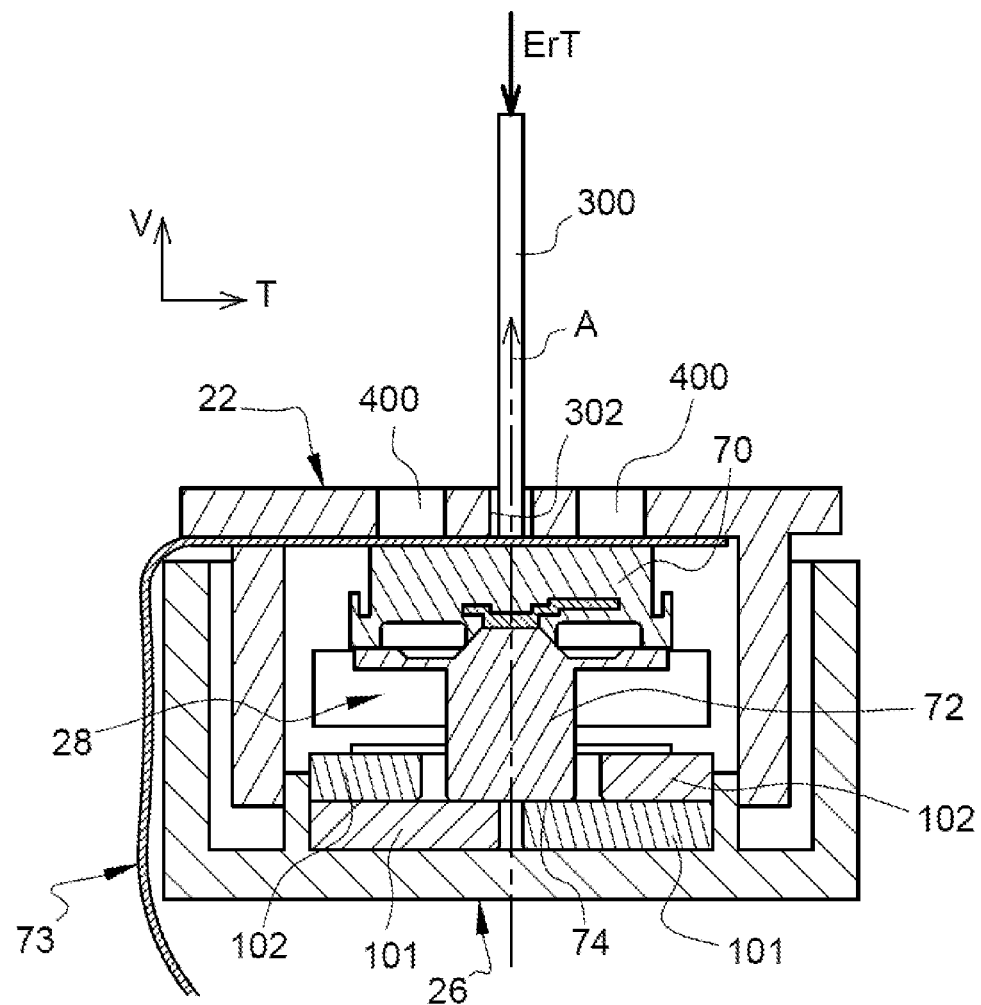
FIG. 13 is a view analogous to that of FIG. 12 that shows a first step of a method for initial adjustment of the calibration of the electric switch.
Figure 14:
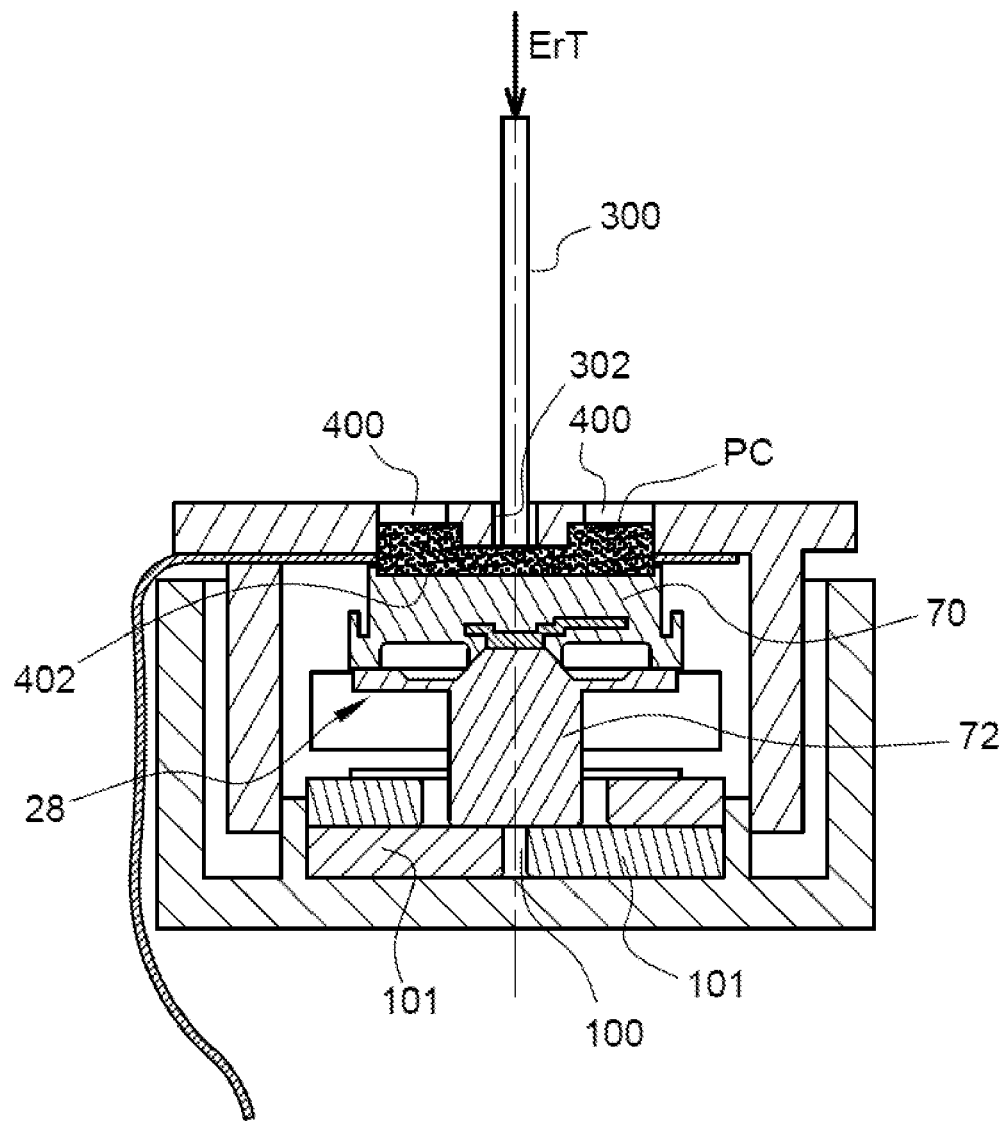
FIG. 14 is a view analogous to that of FIG. 13 that shows a second step of the method for initial adjustment of the calibration of the electric switch.

There has been diagrammatically represented in FIG. 12 a method for adjustment of the initial total height "H" at rest of the control device 20.

If the transverse shafts 84 of the actuator arms 30 are each elastically nested in a complementary housing 68 (so as to retain vertically the shaft 84 and the actuator arms 30 relative to the lower support frame) it is then possible to adjust simultaneously the high position of the upper panel 22 of the control device 20 by applying in the upward vertical direction V a force ErH to the lower faces 109 of the first lateral lugs 101 of the actuator arms 3, that is to say to the proximal ends 32 of the actuator arms 30, until a particular height H of the upper panel 22 relative to the lower support frame 26 is reached.

That force and that fine adjustment may for example be performed by means of an adjuster screw 200 that is mounted by screwing it into a complementary hole 202 in the lower plate 23.

The upper face 204 of the adjuster screw 200 acts simultaneously on the lateral lugs 101.

Once the total height "H" has been reached it suffices for example to immobilize the adjuster screw in rotation.

The adjuster screw 200 therefore constitutes a rest pin that is fixed relative to the lower support frame 26, defining a surface 204 on which the lower faces 109 of the proximal sections 32 of the actuator arms 30 rest to determine the high position of the upper panel 22.

The height adjustment force ErH may be applied by means of a finger received and sliding vertically in a hole 202 and then immobilizing a rest pin on which the proximal sections 32 rest.

In addition to the adjustment of the total height H, the design described in this document enables easy adjustment of the calibration of the trigger force F.

Calibration may occur by applying to the body 70 of the electric switch 28 a calibration adjustment force ErT in the vertically downward direction V to preload the electric switch 28.

This may be achieved for example by means of a feeler 300 that is received in and slides through a central hole 302 in the upper panel and a lower end face of which acts on a facing portion of the upper face of the body 70 of the electric switch 28.

Once the calibration value has been obtained, it is then necessary to produce an adjustment abutment fixed relative to the upper panel 22 defining an abutment surface that cooperates with a facing portion of the body 70 of the electric switch 28 to fix the position of the body of the electric switch 28 relative to the upper panel 22 and then to remove the preloading force ErT.

According to the embodiment shown in the figures the adjustment abutment is produced by forming a block of glue or of resin PC by pouring or otherwise placing the glue or resin through at least one hole 400 in the upper panel 22, so that the lower face 402 of the glue or resin is in contact with the facing portion of the electric switch 28.

Thereafter the step of immobilizing the abutment member may include drying the glue or of resin or hardening the glue or of resin to form the block. The drying or hardening may occur with the assistance of heat and/or forced air, or simply by allowing the glue or resin to dry and harden over time.

Finally, the feeler 300 may be removed.

In a variant (not shown) the abutment member is an abutment pin that is mounted in and slides axially in the vertical direction in a complementary hole in the upper panel 22 and the lower end of which is in contact with the facing portion of the electric switch 28. Immobilizing the abutment member may include placing into the hole glue PC or resin to contact with the upper end of the pin and drying or hardening the glue or resin.

As a further variant an adjuster screw may be used to apply the force ErT and to serve also as an abutment in the adjusted position.

The invention claimed is:

1. A control device for an electronic unit, the control device comprising:
a globally planar and horizontal upper panel on an upper face of which a control member is adapted to exert a control action comprising a pressure force oriented vertically downward;
a lower support frame relative to which the upper panel is mounted to be moved by the control action in a globally vertically downward movement between a high rest position and a low active position;
an electric switch including a switch body and an actuator mounted to be mobile relative to the switch body, the switch body of which is carried by the upper panel and can be actuated by the control action to produce a control signal of the electronic unit when the upper panel is in its low active position; and
a set of at least two actuator arms for actuating the electric switch, in which set each actuator arm comprises:
a distal upper end section that bears vertically upward against a lower portion of the upper panel,
a proximal lower end section for actuating the electric switch that bears on the actuator of the electric switch, and
an intermediate section that bears vertically downward against a facing portion of the lower frame and about which each actuator arm is able to pivot about a horizontal geometric pivot axis;
and in which, when operated:
the actuator arms cooperate with the upper panel and the lower support frame to maintain the upper panel parallel to a horizontal plane during its vertical movement relative to the lower support frame,
a first portion of the proximal lower end section of a first one of the actuator arms bears permanently and vertically upward against a facing second portion of the proximal lower end section of a second one of the actuator arms, and
the first portion of the proximal lower end section of the first one of the actuator arms and a first portion of the proximal lower section of the second one of the actuator arms each bear vertically upward against a facing portion of the actuator of the electric switch.

2. The control device of claim 1, wherein the bearing engagement between a first portion of the proximal section of the first one of the actuator arms and the facing second portion of the proximal section of the second one of the actuator arms comprises a pivoting bearing engagement about the horizontal geometric pivot axis.

3. The control device of claim 1, wherein the first one of the actuator arms and the second one of the actuator arms comprise two opposite arms aligned longitudinally in a globally longitudinal direction orthogonal to the horizontal plane.

4. The control device of claim 1, wherein the electric switch is disposed vertically between a support that is fixed relative to the upper panel and the proximal lower end section of each actuator arm.

5. The control device of claim 1, wherein the distal upper end section of each actuator arm is positioned horizontally in line with a peripheral edge of the upper panel.

6. The control device of claim 1, wherein the electric switch is positioned longitudinally in line with the middle of the upper panel.

7. The control device of claim 1, wherein the control device is of symmetrical design with respect to a vertical and transverse median plane and with respect to a longitudinal and vertical median plane.

8. The control device of claim 1, wherein all the actuator arms are identical.

9. The control device of claim 1, wherein:
the first portion and the second portion of the proximal section of each actuator arm are transversely adjacent; and
the first portion comprises a plane upper bearing facet of the actuator of the electric switch.

10. A method for initial adjustment of a control device, wherein:
the control device comprises:
a globally planar and horizontal upper panel on an upper face of which a control member is adapted to exert a control action comprising a pressure force oriented vertically downward,
a lower support frame relative to which an upper panel is mounted to be moved by the control action in a globally vertically downward movement between a high rest position and a low active position,
an electric switch including a switch body and an actuator mounted to be mobile relative to the switch body, the switch body of which is carried by the upper panel and can be actuated by the control action to produce a control signal of the electronic unit when the upper panel is in its low active position, and
a set of at least two actuator arms for actuating the electric switch, in which set each actuator arm comprises:
a distal upper end section that bears vertically upward against a lower portion of the upper panel;
a proximal lower end section for actuating the electric switch that bears on the actuator of the electric switch; and
an intermediate section that bears vertically downward against a facing portion of the lower frame and about which each actuator arm is able to pivot about a horizontal geometric pivot axis; and
in which:
the actuator arms cooperate with the upper panel and the lower support frame to maintain the upper panel parallel to a horizontal plane during its vertical movement relative to the lower support frame, and
a first portion of the proximal section of a first one of the actuator arms bears permanently and vertically upward against a facing second portion of the proximal section of a second one of the actuator arms, and
the first portion of the proximal section of the first one of the actuator arms and a first portion of the proximal section of the second one of the actuator arms each bear vertically upward against a facing portion of the actuator of the electric switch; and
the method comprises:
applying a force (ErH) in a vertical upward direction (V) to the proximal lower end sections of the actuator arms until a particular height of the upper panel relative to the lower support frame is reached, and
producing a rest pin fixed relative to the lower support frame defining a surface on which the proximal sections of the actuator arms rest to determine the high position of the upper panel.

11. The method of claim 10, wherein the step of producing the rest pin comprises:
   positioning the rest pin relative to the lower support frame so that an upper end of the rest pin cooperates with the proximal lower end sections of the actuator arms; and
   immobilizing the rest pin relative to the lower support frame.

12. The method of claim 10, wherein the rest pin comprises a free end section of a screw mounted on the lower support frame by screwing the free end section thereinto.

13. The method of claim 11, wherein:
   the rest pin comprises a pin that is mounted to slide axially in the vertical upward direction in a hole in the lower support frame;
   an upper end of the rest pin is in contact with proximal lower end sections of the actuator arms; and
   in which the step of immobilizing the rest pin comprises:
      placing glue or resin in the hole to contact the lower end of the rest pin, and
      drying or hardening the glue or resin.

14. The method of claim 10, wherein the force (ErH) is applied by means of the rest pin.

15. A method for initial adjustment of calibration of a device, wherein: the control device comprises:
   a globally planar and horizontal upper panel on an upper face of which a control member is adapted to exert a control action comprising a pressure force oriented vertically downward,
   a lower support frame relative to which an upper panel is mounted to be moved by the control action in a globally vertically downward movement between a high rest position and a low active position,
   an electric switch including a switch body and an actuator mounted to be mobile relative to the switch body, the switch body of which is carried by the upper panel and can be actuated by the control action to produce a control signal of the electronic unit when the upper panel is in its low active position, and
   a set of at least two actuator arms for actuating the electric switch, in which set each actuator arm comprises:
      a distal upper end section that bears vertically upward against a lower portion of the upper panel;
      a proximal lower end section for actuating the electric switch that bears on the actuator of the electric switch; and
      an intermediate section that bears vertically downward against a facing portion of the lower frame and about which each actuator arm is able to pivot about a horizontal geometric pivot axis; and
   in which:
      the actuator arms cooperate with the upper panel and the lower support frame to maintain the upper panel parallel to a horizontal plane during its vertical movement relative to the lower support frame;
      a first portion of the proximal section of a first one of the actuator arms bears permanently and vertically upward against a facing second portion of the proximal section of a second one of the actuator arms; and
      the first portion of the proximal section of the first one of the actuator arms and a first portion of the proximal section of the second one of the actuator arms each bear vertically upward against a facing portion of the actuator of the electric switch; and
   the method comprises:
      applying to the switch body of the electric switch a force (ErT) in the downward vertical direction (V) to preload the electric switch, and
      producing an adjustment abutment fixed relative to the upper panel defining an abutment surface that cooperates with a facing portion of the body of the electric switch to fix the position of the body of the electric switch relative to the upper panel.

16. The method of claim 15, wherein the step of producing the adjustment abutment comprises:
   positioning an abutment member relative to the upper panel so that a lower end of the abutment member is in contact with the facing portion of the switch body of the electric switch; and
   immobilizing the abutment member relative to the upper panel.

17. The method of claim 15, wherein:
   positioning the abutment member comprises placing glue or resin into a hole in the upper panel so that a lower face of a block formed of the glue or resin is in contact with the facing portion of the electric switch; and
   immobilizing the abutment member comprises drying or hardening the glue or resin.

18. The method of claim 15, wherein:
   the abutment member comprises an abutment pin;
   positioning the abutment member comprises mounting the abutment pin to slide axially in the vertical direction (V) in a complementary hole in the upper panel so that the lower end of the abutment member is in contact with the facing portion of the electric switch; and
   the step of immobilizing the abutment member comprises placing glue or resin to contact an upper end of the abutment pin and drying or hardening the glue (PC) or resin.

19. The method of claim 15, wherein applying the preloading force (ErT) comprises doing so by means of a removable preloading finger that is guided to slide vertically relative to the upper panel.

20. A device for operating a motor vehicle rear view mirror comprising:
   a device for controlling an electronic unit of a motor vehicle rear view mirror, wherein the device comprises:
      a globally planar and horizontal upper panel on an upper face of which a control member is adapted to exert a control action comprising a pressure force oriented vertically downward,
      a lower support frame relative to which an upper panel is mounted to be moved by the control action in a globally vertically downward movement between a high rest position and a low active position,
      an electric switch including a switch body and an actuator mounted to be mobile relative to the switch body, the switch body of which can be actuated by the control action to produce a control signal of the electronic unit when the upper panel is in its low active position, and
      a set of at least two actuator arms for actuating the electric switch, in which set each actuator arm comprises:
         a distal upper end section that bears vertically upward;
         a proximal lower end section for actuating the electric switch that bears on the actuator of the electric switch; and
         an intermediate section that bears vertically downward against a facing portion of the lower frame and about which each actuator arm is able to pivot about a horizontal geometric pivot axis; and in which, when operated:
- the actuator arms cooperate with the upper panel and the lower support frame to maintain the upper panel parallel to a horizontal plane during its vertical movement relative to the lower support frame; and
- a first portion of the proximal section of a first one of the actuator arms bears permanently and vertically upward against a facing second portion of the proximal section of a second one of the actuator arms; and
- the first portion of the proximal section of the first one of the actuator arms and a first portion of the proximal section of the second one of the actuator arms each bear vertically upward against a facing portion of the actuator of the electric switch.

* * * * *